N. J. TEMPLETON.
Machines for Sawing Staves.
No. 136,559.       Patented March 4, 1873.
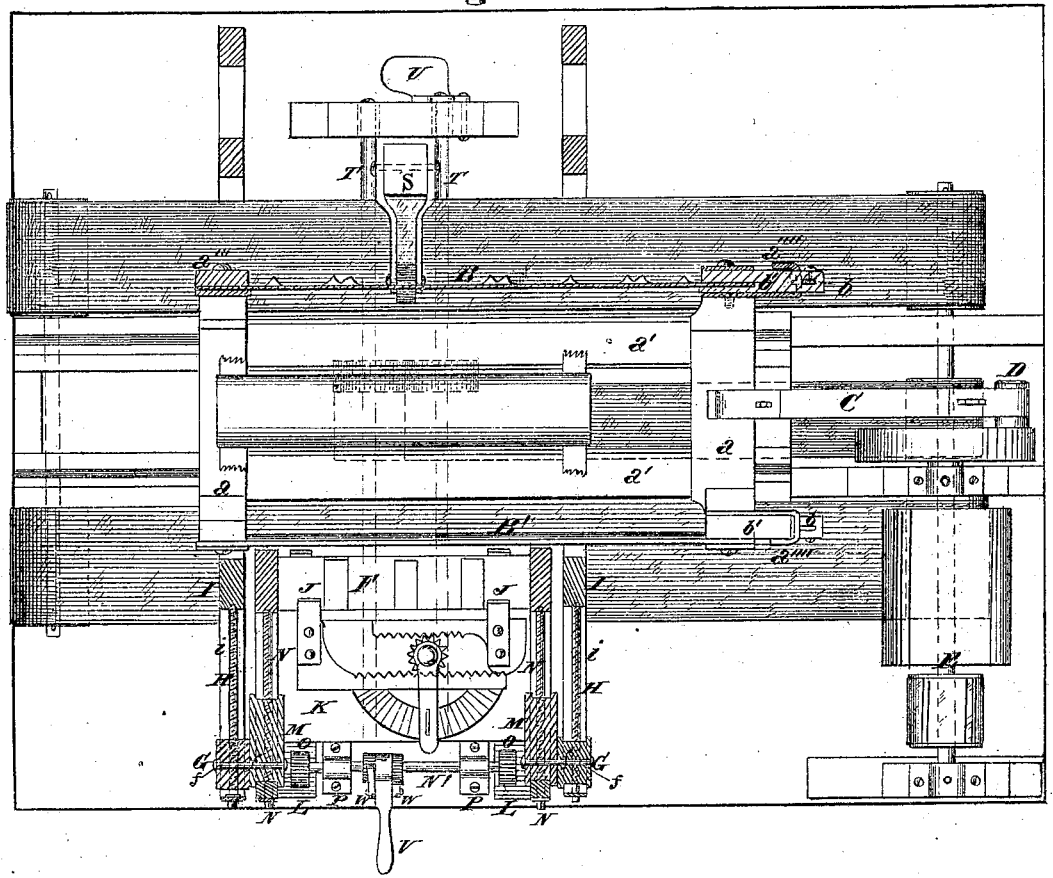
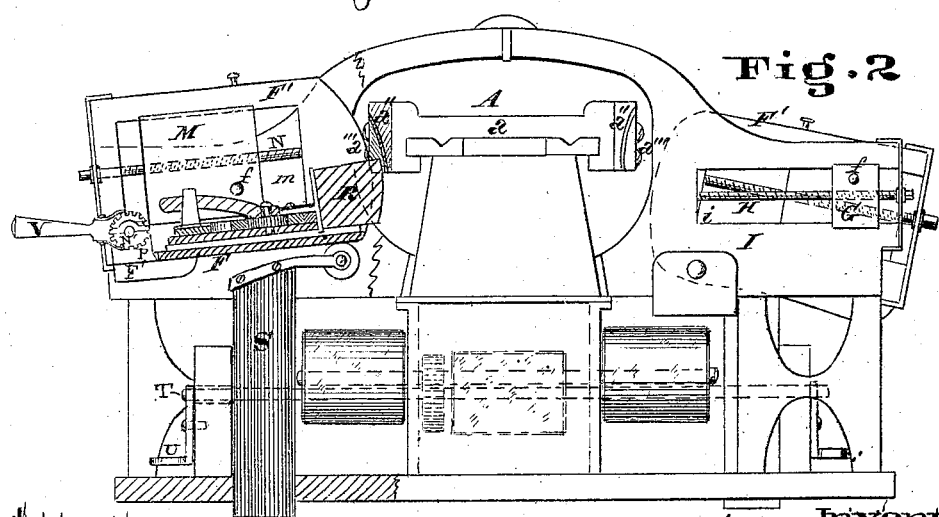

UNITED STATES PATENT OFFICE.

NICHOLAS J. TEMPLETON, OF CINCINNATI, OHIO, ASSIGNOR TO HIMSELF AND HENRY C. EZEKIEL.

IMPROVEMENT IN MACHINES FOR SAWING STAVES.

Specification forming part of Letters Patent No. 136,559, dated March 4, 1873.

*To all whom it may concern:*

Be it known that I, NICHOLAS J. TEMPLETON, of Cincinnati, Hamilton county, State of Ohio, have invented certain new and useful Improvements in Machines for Sawing Staves, of which the following is a specification:

Nature and Objects of the Invention.

My invention relates to improvements upon the stave-sawing machine for which Letters Patent were granted to me and Henry C. Ezekiel, April 16, 1872; and consists in the provision of peculiarly-constructed reversible and adjustable boxes, for the purpose of varying the radius of the circular arc in which the staves are cut.

Description of the Accompanying Drawing.

Figure 1 is a plan of a machine embodying my invention. Fig. 2 is a cross-section of the same.

General Description.

The frame A for supporting and stretching the saw is composed of heads $a\,a$, connecting-bars $a'$, saw-beds $a''$, screw-caps $a'''$, and sockets $a''''$. The saws B B' are firmly secured to frame A by the screws of caps $a'''$, and are stretched by the keys $b$ in the enlarged ends $b'$ of the saws against the face of the sockets $a''''$, through which the saws pass. The frame A is operated by the pitman C, which receives its reciprocating motion through crank D and driving-shaft E. The table F, on which the block to be cut is placed, forms a part of the frame F', which swings upon the adjustable centers $f$. The centers or pins $f$, on which this table oscillates, are fitted to the blocks G, which, by means of adjusting-screws H, are rendered adjustable in the slots $i$ of the main frame I, for the purpose of changing at will the radius of the arc of the circle in which the staves are cut.

In the operation of the machine the block rests and slides, while being fed, upon the table F, and is at the same time firmly held by the clamps J on the sliding plate K, the latter being furnished with racks L, by which it is operated. The table F can hold the same relation to the saw with regard to the distance of its inner edge from the path of the saw under the varying adjustment of the blocks G by reason of the provision of the adjustable blocks M and adjusting-screws N.

The blocks M and G, with their adjusting-screws, differ from those shown in TEMPLETON and EZEKIEL's patent of April 16, 1872, aforesaid in this, that the blocks M are so constructed and arranged in the slots $m$ that the centers $f$ are fitted to the blocks in a position nearer to one end than the other, for the purpose of enabling the radius of the circle in which the staves are cut to be materially shortened by simply reversing the blocks M, or changing them end for end in the slots $m$. The clamps J are operated to close upon the block to be cut, and open to release the same by the same double rack-and-pinion device illustrated in the patent of TEMPLETON and EZEKIEL, April 16, 1872, aforesaid.

The table or plate K is operated by the shaft N' and pinions O, the shaft being journaled in bearings P attached to the frame F', and the pinions O gearing into the racks L. The table F is elevated or swung on the centers $f$, in order to press the block R upward in the act of severing the stave from it by the vertically-sliding post S, operated by the frictional contact of one of the shafts T, the frictional contact being broken by the release of treadle U, and applied by the pressure of the foot upon the same. V is a lever fitted loosely to the shaft N', the lever being fitted with pawls W, which are so connected together and to the lever V that the act of placing one of them into gear with its pinion throws the other out, the pawls engaging on opposite sides of the lever, one acting when in gear to move the block toward the saw and the other from it.

The advantages in the peculiar construction of the frame for the saws are that by the provision of the two saws, the work is balanced; by the provision of the connecting-bars $a'$ the stiffening-bars shown in the patent of TEMPLETON and EZEKIEL are dispensed with; and by the provision of the enlarged ends to the saws and the sockets $a''''$ the saws are properly stretched.

Claim.

In a stave-sawing machine, the combination of the swinging work-table and frame F F', sliding blocks G, and reversible sliding blocks M, to which the table is hung eccentrically at $f$, substantially as and for the purposes specified.

In testimony of which invention I hereunto set my hand.

NICHOLAS J. TEMPLETON.

Witnesses:
 HARVEY MILLWARD,
 WM. B. McCOMAS.